July 17, 1962 P. J. VITALE 3,044,784

TURNTABLE ASSEMBLY FOR PHONOGRAPH RECORDS

Filed Nov. 3, 1958 4 Sheets-Sheet 1

INVENTOR.
PAUL J. VITALE
BY
Kane, Dalsimer and Kane
ATTORNEYS

July 17, 1962 P. J. VITALE 3,044,784

TURNTABLE ASSEMBLY FOR PHONOGRAPH RECORDS

Filed Nov. 3, 1958 4 Sheets-Sheet 2

INVENTOR.
PAUL J. VITALE

BY Kane, Dalsimer and Kane

ATTORNEYS

TURNTABLE ASSEMBLY FOR PHONOGRAPH RECORDS

Filed Nov. 3, 1958 4 Sheets-Sheet 3

INVENTOR.
PAUL J. VITALE
BY
Kane, Dalsimer and Kane
ATTORNEYS

July 17, 1962 P. J. VITALE 3,044,784

TURNTABLE ASSEMBLY FOR PHONOGRAPH RECORDS

Filed Nov. 3, 1958 4 Sheets-Sheet 4

INVENTOR.
PAUL J. VITALE
BY
Kane, Dalsimer and Kane
ATTORNEYS

United States Patent Office
3,044,784
Patented July 17, 1962

3,044,784

TURNTABLE ASSEMBLY FOR PHONOGRAPH RECORDS

Paul J. Vitale, West Babylon, N.Y., assignor to Pickering Associates, Inc., Plainview, N.Y., a corporation of New York Filed Nov. 3, 1958, Ser. No. 771,370
12 Claims. (Cl. 274—39)

This invention relates to an improved turntable assembly for phonograph records of the disc type and, more particularly, to an improved mounting for supporting the turntable.

In the high fidelity reproduction of sound, each component used in the sound reproduction system may be compared with the link in a chain and the quality of the sound reproduction is limited by the performance of the individual components. In disc recordings, it is desirable that the turntable have a stable mounting so that it can be uniformly rotated at a predetermined rate of speed around a fixed center and in a fixed plane and, at the same time, that friction be reduced to a minimum.

Excessive friction interferes with uniform rotation at a selected predetermined rate of speed. In addition, where the turntable is responsive to external vibrations, particularly vibrations within the audio frequency range, interference or distortion known as "rumble" occurs in the pickup. Since the advent of stereophonic sound reproduction, vertical vibration or 'rumble" in disc recordings has become significant since a vertical component of motion is present in transducing the modulations of the two channels of the sound groove.

It is accordingly a particular object of the present invention to provide an improved turntable assembly for phonograph records having a mounting which minimizes friction and provides relatively high stability so that the turntable may rotate uniformly around a fixed center and in a fixed plane, regardless of external vibrations, with the mounting serving as a mechanical filter substantially eliminating external vibrations within the audio frequency range and consequently eliminating the "rumble" effect resulting therefrom.

A further object is the provision of an improved phonograph turntable assembly and mounting of the above character which are relatively simple and inexpensive to manufacture, which have relatively few moving parts and in which friction and wear are reduced to a minimum so that the assembly will give satisfactory service over a realtively long period of time with comparative freedom from repair.

My invention contemplates the use of opposing magnetic fields by arranging like poles of magnets in spaced repelling relationship for rotatably supporting a phonograph turntable against the force of gravity. The strength of the magnetic fields with respect to the mass of the supported system is such that the natural period of vibration or point of resonance is at a frequency lower than the audio frequency range. In addition, the supporting structure is preferably provided with a resilient mounting whose spring constant with respect to the mass of the structure is such that the natural period of vibration is below the audio band. Also, the motor for operating the turntable may be insulated from its support by similar resilient means. In this fashion, a mechanical filter system is provided for eliminating vibrations within the audio range and for eliminating the "rumble" effect resulting therefrom.

In the accompanying drawings.

Figure 1:
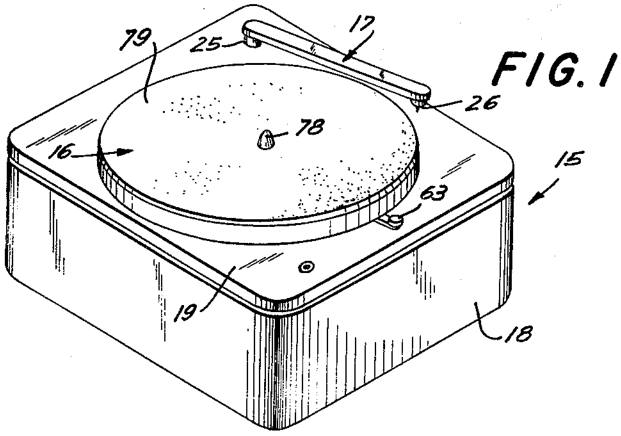
FIG. 1 is a perspective view of a phonograph turntable assembly embodying my invention.

My improved turntable assembly comprises generally a supporting structure 15 with a turntable 16 supported thereon for rotary motion by my new mounting means and also having a tone arm 17 pivotally supported thereon so that the stylus of the pickup can track the groove of a record disc on the turntable.

The turntable is mounted on the supporting structure by means of a bearing assembly which includes a pair of magnets arranged with their poles in spaced repelling relationship, as well as a guide spindle to retain the turntable against radial and lateral displacement. My improved bearing assembly reduces friction to a minimum and also serves as a mechanical filter for eliminating vibrations within the audio range. I have also found that it is frequently desirable to provide other mechanical filters which will serve to isolate the tone arm and pickup from external vibrations and also serving to prevent vibrations from the drive motor from affecting the turntable. In the specification, I will describe the other mechanical filter systems before describing my improved bearing assembly.

The supporting structure comprises a base or cabinet 18 having a mounting plate 19 supported thereon by a resilient mounting which serves as a mechanical filter for outside vibrations within the audio frequency range. The resilient mounting for the mounting plate 19 preferably takes the form of four helical springs 20 positioned adjacent the four corners of the cabinet and extending between the base 21 and the undersurface of the mounting plate.

The springs are held in place by lugs 22 and 23 projecting upwardly from the base of the cabinet and downwardly from the mounting plate into tight frictional engagement with the windings of the helical springs adjacent the two ends thereof.

The springs are of a length so that when the mounting plate and the associated mechanism mounted thereon are supported on the springs, the mounting plate will be disposed a short distance above the upper edges of the side walls of the cabinet. The springs are selected so that the relationship between the spring constants and the supported mass is such that the natural period of vibration of the supported system is below the audio frequency range. The audio frequency range is generally considered between approximately twenty and sixteen thousand cycles per second. Accordingly, springs are selected which will result in a spring supported system having a natural period of vibration lower than twenty cycles per second and preferably lower than ten cycles per second.

The tone arm 17 is pivotally mounted on the mounting plate 19 adjacent one end 25 and has a phonograph pickup 26 adjacent the other end which is provided with a stylus for tracking the record groove. Thus, the system of springs 20 serve as a mechanical filter preventing the transmission of vibrations in the audio range to the tone arm and pickup.

Figure 2:
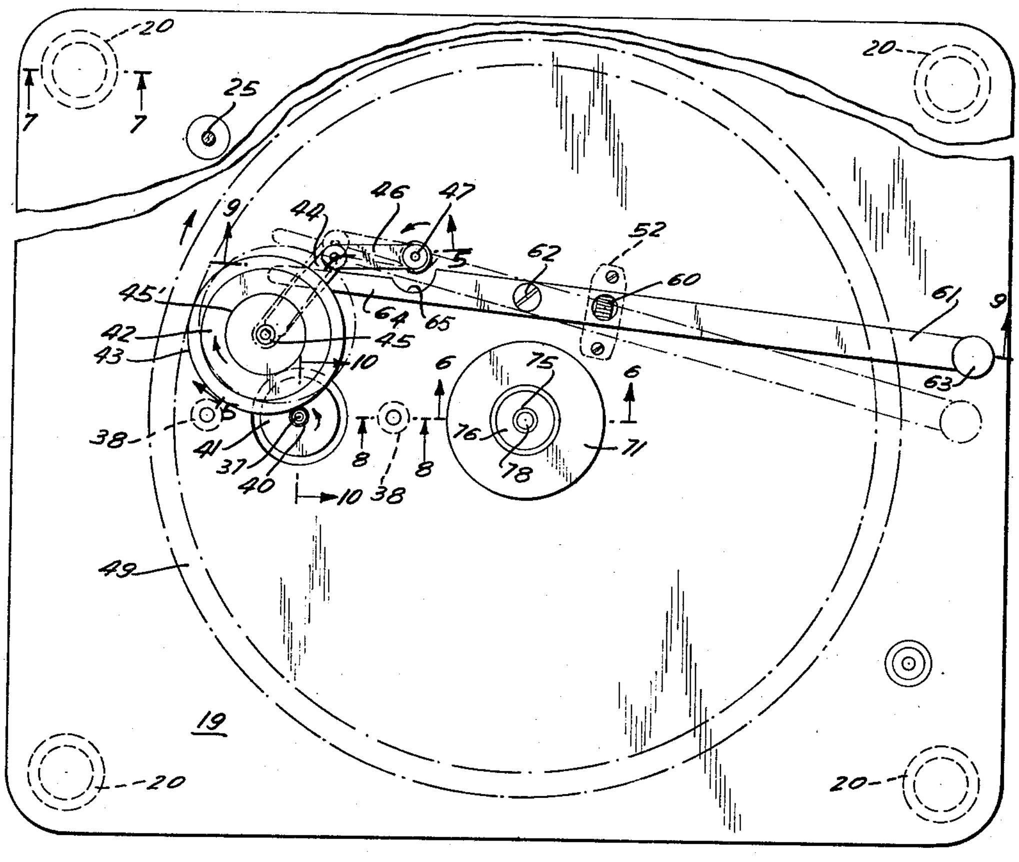
FIG. 2 is a top plan view of the assembly with portions omitted and with the turntable removed.

The mounting plate 19 also supports the turntable 16 for rotary motion, as well as the driving mechanism for causing the rotation of the turntable in a clockwise direction as viewed in FIGS. 1 and 2, and also the control means for starting and stopping the operation thereof.

Thus, on the underside of the mounting plate at a point adjacent one side of the turntable, I provide a motor housing or casing 28 in which a motor 29 is resiliently supported. The motor housing is secured to the underside of the mounting plate by suitable means such as the screws 30. The lower wall of the motor housing is provided with a central aperture 31 having an inturned generally circular flange 32 serving to receive and center the lower end of a tapered helical spring 33 of generally truncated conical shape. The spring surrounds the lower end 34 of the motor shaft and the upper end thereof engages the motor casing immediately surrounding the shaft. The spring 33 serves to support the weight of the motor and shaft against the force of gravity and the spring constant relative to the weight of the motor shaft and associated parts should be such that the natural period of vibration is below the audio frequency band, i.e. below twenty cycles per second and preferably below ten cycles per second. The truncated conical shape of the spring serves to impart additional lateral stability thereto.

Figure 8:
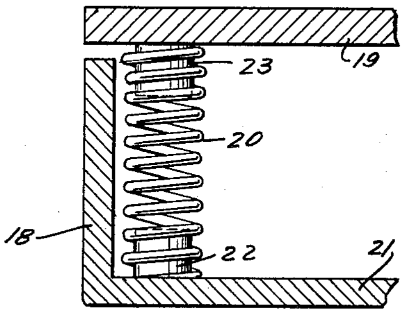
FIG. 8 is a detailed sectional view in the direction of the arrows on the line 8—8 of FIG. 2, showing one of the resilient stability mounts for stabilizing the mounting of the motor for driving the turntable.
Figure 7:
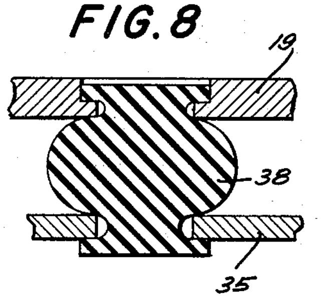
FIG. 7 is a detailed sectional view in the direction of the arrows on the line 7—7 of FIG. 2, showing one of the resilient supports for the mounting plate.
Figure 9:
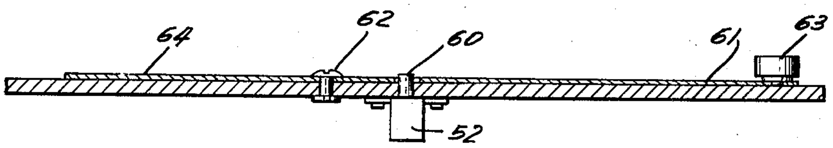
FIG. 9 is a detailed sectional view on a reduced scale in the direction of the arrows of the line 9—9 of FIG. 2, showing the arrangement of the control arm for controlling the operation of the turntable.
Figure 10:
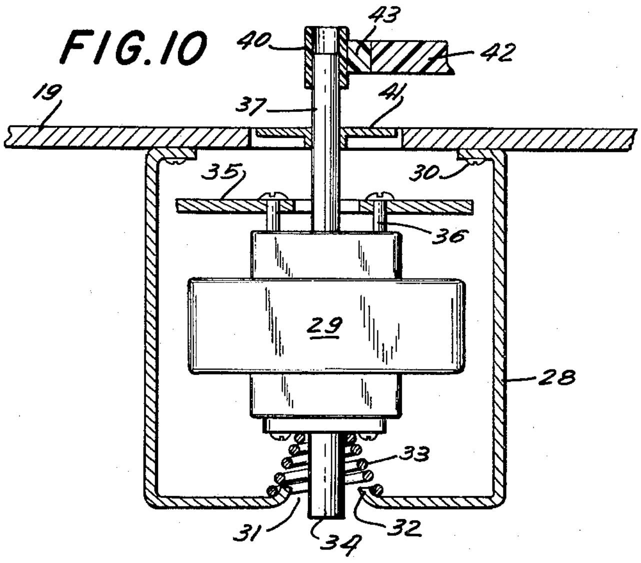
FIG. 10 is a detailed sectional view in the direction of the arrows in the line 10—10 in FIG. 2, illustrating the drive motor for the turntable and the mounting mechanism therefor.

The upper end of the motor is stabilized by means of a stability plate 35 secured to the motor casing by suitable means such as screws 36 and having a central aperture through which the upper end 37 of the motor shaft projects. A pair of stabilizers 38 made of rubber, neoprene or other suitable flexible resilient material are connected between the opposite sides of the stability plate and the mounting plate 19 to retain the motor against lateral displacement, and also serving as shock absorbers to prevent the transmission of vibrations in the audio range. Thus, as shown most clearly in FIG. 8, each stabilizer consists of an enlarged body portion with a pair of heads connected to opposite ends thereof by a reduced neck portion. The necks of the stabilizers project through apertures formed in the stability plate and mounting plate with the heads overlapping the opposite surfaces thereof so as to hold the stabilizers in place.

The upper end of motor shaft 37 projects above mounting plate 19 and is provided with suitable friction drive such as sleeve 40 made of a relatively hard rigid resinous material presenting a friction surface such as Bakelite, phenolic resin or the like. A cooling fin 41 in the form of a thin disc made of aluminum or other good thermal conducting material is provided around the shaft 37 adjacent the upper end thereof to help dissipate heat resulting from the friction drive. The cooling fin is preferably disposed in an enlarged aperture provided in the mounting plate 19.

The drive sleeve 40 of the motor may be operatively engaged with a friction wheel or disc 42 which, in turn, may be operatively engaged with a flange or apron depending from the peripheral edge of the turntable. The friction wheel or disc preferably has a central portion made of a yielding flexible resilient material such as foam rubber, polyurethane foam or polyvinyl foam or the like and has a rim or peripheral band 43 extending therearound. The band or rim 43 is likewise made of a flexible material to permit deformation of the friction wheel or disc but the material should be capable of withstanding friction and wear. For this purpose, I may employ neoprene, natural rubber, polyvinyl chloride or the like.

Figures 4, 5:
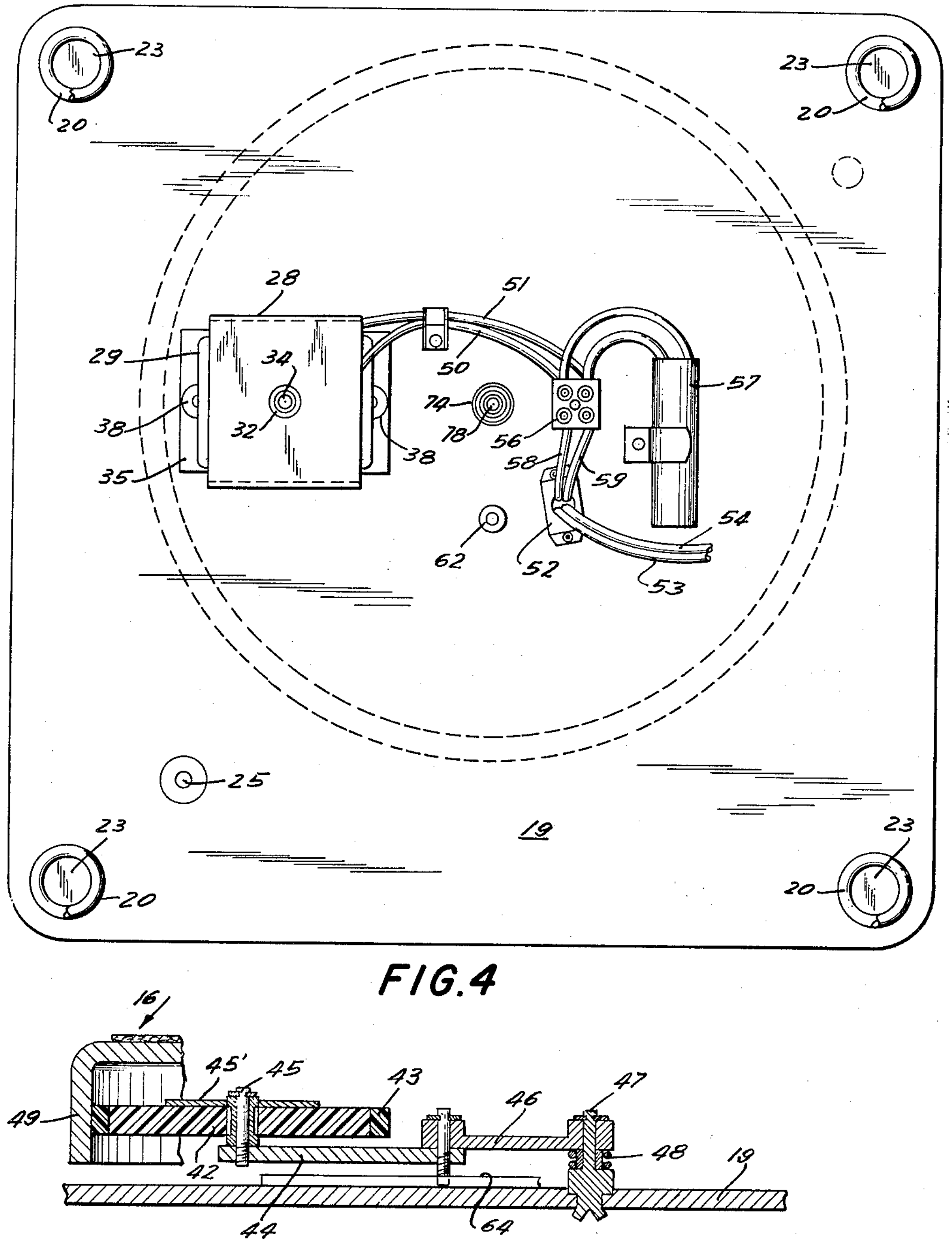
FIG. 4 is a bottom plan view of the mounting plate and associated parts.
FIG. 5 is a detailed sectional view in the direction of the arrows on the line 5—5 of FIG. 2, showing a portion of the drive mechanism for causing the rotation of the turntable.

As shown most clearly in FIG. 4, friction wheel or disc 42 is mounted for rotary motion on the end of a link 44 by means of pivot or shaft 45 and a washer 45' of rigid or semi-rigid material may reinforce the central portion of the disc. The opposite end of link 44 is pivotally connected as shown to link 46 which, in turn, is pivotally mounted on mounting plate 19 by pivot 47. The lower end of pivot 47 is anchored in the mounting plate against rotation and a helical spring 48 surrounds the pivot with its two ends engaging the pivot mounting and link 46 respectively so as to normally stress or rotate it in a counter-clockwise direction as shown in FIG. 2. Thus, under the action of spring 48 and in the absence of any restraining force, link 46 is caused to rotate in a counter-clockwise direction with the result that friction wheel or disc 42 is shifted into engagement with the drive sleeve 40 of the motor and with peripheral flange 49 and turntable 16. The motor is arranged to rotate in a counter-clockwise direction as shown in FIG. 2 with the result that friction wheel 42 and turntable 16 are rotated in a clockwise direction.

It will be seen that the direction of rotation of drive sleeve 40 is such as to reinforce the action of spring 48 and to normally retain the friction wheel in engagement therewith and in engagement with the flange of the turntable. It will also be appreciated that the construction of the friction wheel is such as to provide for uniformity of speed of rotation of the turntable. Thus, even though the central foam portion of the friction wheel is deformed, the peripheral length of the band or rim 43 remains the same so that one rotation of the friction wheel will always cause the same amount of rotation of the turntable 16.

Figures 3, 6, 11:
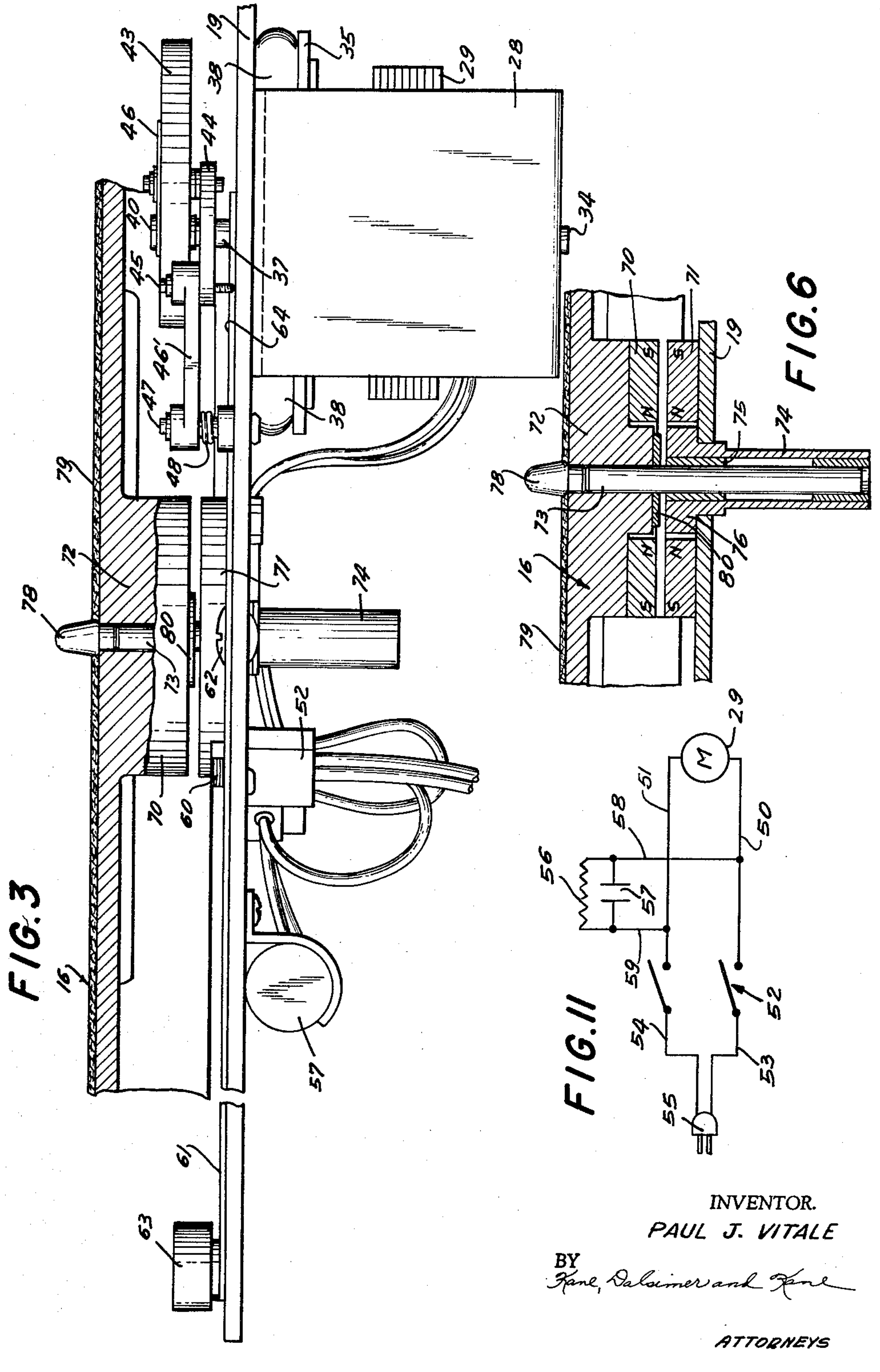
FIG. 3 is a partially sectional and partially elevational view of the turntable assembly with portions of the turntable and of the mounting plate omitted.
FIG. 6 is a detailed sectional view in the direction of the arrows on the line 6—6 of FIG. 2, showing the arrangement of the magnets, spindle and associated mechanisms.
FIG. 11 is a diagram of one electrical circuit which may be used with my apparatus.

The motor is suitably connected to a source of electric current as by means of leads 50 and 51 connected to double pole switch 52 which, in turn, may be connected by leads 53 and 54 to a jack or plug 55. One suggested arrangement of the electrical wiring beneath the mounting plate 19 is shown in FIG. 4, while a circuit diagram is shown in FIG. 11. Motor 29 is preferably of the synchronous type and a suitable click filter in the form of a resistance 56 and condenser 57 may be connected in parallel therewith by leads 58 and 59 connected to leads 50 and 51 respectively.

A suitable operating lever or toggle 60 is provided for switch 52 and it projects upwardly through an aperture formed in mounting plate 19 so as to be exposed on the upper surface of the mounting plate beneath the turntable. A suitable control arm 61 is provided for operating the switch. Thus, the control arm is pivotally mounted at 62 and is provided with a small aperture which receives and engages the operating toggle 60 of the switch. When the control arm 61 is shifted in a counter-clockwise direction to the position shown in full lines in FIG. 2, the switch is turned on and the motor circuit is completed. When the control arm is shifted in a clockwise direction to the position shown in dotted lines in FIG. 2, the switch 52 is turned off and the motor circuit is opened. To facilitate the shifting of the control arm, I provide an operating handle 63 at the outer end thereof which is positioned to one side of the turntable.

In order to prevent the friction wheel 42 from taking a permanent set in a distorted condition, I also provide the control handle 61 with suitable means, in the form of an extension 64, for disengaging the friction wheel from the drive sleeve and turntable flange when control arm 61 is rotated in a clockwise direction to the position shown in dotted lines in FIG. 2 to shut off the motor. This extension 64 is provided with a recess or cutout 65 for accommodating the pivotal mounting 47 for link 46. The recess 65 provides adequate clearance so that extension 64 shifts the pivot 45 to cause the disengagement of the friction wheel. Thus, it will be seen that the drive motor can be shut on or off and the friction wheel engaged or disengaged simply by moving the control arm 61. The toggle 60 of the switch presents sufficient resistance to operation to retain the control arm in either the on or off positions regardless of the action of spring 48.

The friction wheel 42 provides a positive drive for the turntable at a uniform rate of speed. It also serves as a mechanical filter or shock absorber to prevent vibrations from being transmitted through the drive mechanism to the turntable.

As previously indicated, the turntable 16 is mounted on the supporting structure by means of an improved bearing assembly which not only minimizes friction but also serves as a mechanical filter to eliminate vibrations within the audio band. This bearing assembly takes the form of a pair of magnets mounted on the undersurface of the turntable and on the mounting plate respectively with their poles in repelling relationship and an aligning spindle to prevent radial or lateral displacement of the turntable.

The magnets are preferably ring-shaped permanent magnets 70 and 71 of similar size and shape. The magnet 70 is mounted on the undersurface of turntable 16 concentric with the center thereof and magnet 71 is mounted on mounting plate 19 in confronting relationship with the magnet 70. For this purpose, the central portion of the turntable may be provided with a downwardly projecting portion 72 which accommodates the magnet as shown and the magnet is cemented or otherwise firmly secured in position. The turntable, particularly the portions in contact with magnet 70, is made of non-magnetic material.

A vertical shaft or spindle 73 is fixedly secured in the central portion of the turntable in the projection 72 and projects downwardly through the two magnets and is received in the sleeve or socket 74 disposed in an aperture in mounting plate 19. The sleeve may be provided with one or more lateral bearings 75 to prevent radial displacement of the spindle. However, the sleeve is free from any thrust or supporting engagement with the end of the spindle so that the spindle does not support any of the weight of the turntable but merely serves to prevent radial or lateral displacement thereof. The upper end of the sleeve is provided with a fitting 76 secured to the mounting plate and substantially filling the space inside ring magnet 71.

The two magnets 70 and 71 present opposing magnetic fields of sufficient strength to support the weight of the turntable against the force of gravity when the magnets are arranged in spaced repelling relationship. Thus, when the turntable 16 is rotated, the entire weight thereof is sustained by the repelling magnetic force with the spindle simply serving to prevent radial displacement, thereby reducing friction to a minimum.

So that the magnetic bearing assembly will serve as a mechanical filter, I selected magnets in which the repelling force of the magnets relative to the weight of the turntable and associated parts is such that the natural period of vibration of the supported system is at a lower frequency than the audio sound band. In other words, the natural period of vibration of the magnetically supported turntable system should be less than twenty cycles per second and preferably less than ten cycles per second.

Any desired type of ring-shaped magnets having spaced poles which can be arranged in repelling relationship and presenting magnetic fields of the required strength may be used. However, I prefer to employ permanent magnets of high coercive force so that they will not become demagnetized when arranged in repelling relationship. For this purpose, I have found that highly coercive barium ferrite permanent magnets serve very satisfatorily such as those which are commercially available under the name of Indox V from the Indiana Steel Products Company of Valparaiso, Indiana.

The magnets may be magnetized or polarized in a fashion so that one pole is on one surface of the magnet and the other pole on the opposite surface of the magnet in which case the two similar poles of the magnet will be arranged in spaced confronting relationship so that they will repell each other. However, I have found that particularly satisfactory results are obtained by polarizing or magnetizing the magnets in the manner indicated in FIG. 6 so that the two poles of each magnet faces towards the same surface thereof, with one pole being positioned adjacent the inner periphery of the surface and the other pole being positioned adjacent the outer periphery of the same surface. The magnets are arranged with corresponding poles arranged in similar relationship and the surfaces of the two magnets having the poles thereon are arranged in spaced confronted relationship as shown in FIG. 6.

Thus, in the magnets shown in FIG. 6, the north poles are arranged adjacent the inner periphery of the rings and the south poles are arranged adjacent the outer periphery of the rings. By this arrangement, the field strength of the magnets is used most efficiently for exerting repelling force.

As shown, the turntable is also preferably provided in the usual manner with a central upwardly projecting pin 78 for receiving and centering the record disc on the turntable, and a suitable cushion or covering 79 made of felt or other similar material is applied to the upper surface of the turntable. A cushion 80 is made of cork felt, polyethylene or other similar material is also preferably applied to the central portion of the depending lug 72 of the turntable so as to prevent direct engagement between the magnets should the turntable be forced downwardly.

In using my improved turntable assembly, the parts are assembled as shown with the poles of the magnets in repelling relationship and the turntable is thus supported for rotary motion with a minimum of friction. Due to the relationship between the repelling force of the magnets and the weight of the supported turntable assembly, a mechanical filtering action is obtained which substantially eliminates mechanical vibrations within the audio band. The spring suspensions 20 for the mounting plate 19 and the spring suspension 33 for motor 29 and also the friction wheel 42 serve similarly as mechanical filters to prevent the transmission of vibrations in the audio range.

It will thus be seen that I have provided an improved turntable assembly for phonograph records having a mounting which minimizes friction and provides relatively high stability so that the turntable may rotate uniformly around a fixed center and in a fixed plane, regardless of external vibrations, with the mounting serving as a mechanical filter substantially eliminating external vibrations within the audio frequency range and consequently eliminating the "rumble" effect resulting therefrom.

Modifications may be made in the illustrated and described embodiment of my invention without departing from my invention as set forth in the accompanying claims.

I claim:

1. A phonograph turntable assembly comprising a supporting structure, a turntable having a flat upper surface for supporting a phonograph record disc, and means for supporting said turntable on said supporting structure for rotary motion including a first ring-shaped magnet mounted on the undersurface of the turntable concentric with the center thereof, and a second ring-shaped magnet mounted on the supporting structure beneath the turntable with the poles of the two magnets arranged in superimposed vertically spaced repelling relationship, the said magnets presenting vertically opposing magnetic fields of sufficient strength to support the weight of said turntable against the force of gravity and the repelling force of said magnets relative to the weight of said turntable being such that the natural period of vibration of the system is at a lower frequency than the audio sound band whereby the supporting means for the turntable serves as a mechanical filter for external vibrations in the audio range.

2. A phonograph turntable assembly as set forth in claim 1 in which the two magnets are of substantially the same size and shape.

3. A phonograph turntable assembly as set forth in claim 1 in which a guide spindle extends through said ring-shaped magnets between the turntable and supporting structure, said spindle being free from axially thrust engagement with one of said parts so that it does not support any of the weight of said turntable while at the same time serving to retain said turntable against radial or lateral displacement.

4. A phonograph turntable assembly as set forth in claim 1 in which a guide spindle is secured to the center of said turntable and projects downwardly through the center of the two magnets into a socket formed in the supporting structure, said spindle being free from axially thrust engagement with said socket so that it does not support any of the weight of said turntable but serves to retain said turntable against radial or lateral displacement.

5. A phonograph turntable assembly comprising a supporting structure, a turntable having a flat upper surface for supporting a phonograph record disc, means for supporting said turntable on said supporting structure for rotary motion including a first ring-shaped magnet mounted on the undersurface of the turntable concentric with the center thereof and a second ring-shaped magnet mounted on the supporting structure beneath the turntable with the poles of the two magnets arranged in superimposed vertically spaced repelling relationship, the said magnets presenting vertically opposing magnetic fields of sufficient strength to support the weight of said turntable against the force of gravity and the repelling force of said magnets relative to the weight of said turntable being such that the natural period of vibration of the system is at a lower frequency than the audio sound band whereby the supporting means for the turntable serves as a mechanical filter for external vibrations in the audio range, guide means to restrain said turntable against radial or lateral displacement in the form of a spindle extending through said first and second magnets between the supporting structure and the center of the turntable, a motor having means for operatively connecting it to the turntable to cause the rotation thereof and a resilient mounting for mounting the motor on the supporting structure and for isolating the supporting structure from vibrations of the motor.

6. A phonograph turntable assembly comprising a supporting structure including a base, a supporting plate and resilient means supporting said plate on the base and having a spring constant relative to the mass of the supported system whereby the natural period of vibration of the system is at a lower frequency than the audio sound band; a phonograph pickup arm mounted on said mounting plate for tracking movement; a turntable having a flat upper surface for supporting a phonograph record disc; means for supporting said turntable on said supporting structure for rotary motion including a first ring-shaped magnet mounted on the undersurface of the turntable concentric with the center thereof and a second ring-shaped magnet mounted on the mounting plate beneath the turntable with the poles of the two magnets arranged in superimposed vertically spaced repelling relationship, the said magnets being of substantially the same size and shape and presenting vertically opposing magnetic fields of sufficient strength to support the weight of said turntable against the force of gravity and the repelling force of said magnets relative to the weight of the said turntable being such that the natural period of vibration of the system is at a lower frequency than the audio sound band whereby the supporting means for the turntable serves as a mechanical filter for external vibrations in the audio range; and guide means for restraining the turntable against radial or lateral displacement and including a spindle extending through said magnets between the central portion of the turntable and the mounting plate for retaining said turntable against radial or lateral displacement.

7. A phonograph turntable assembly as set forth in claim 6 having a motor provided with means for operatively connecting it to the turntable for causing the rotation thereof and resilient mounting means supporting the motor on the mounting plate so as to isolate it from vibrations of the motor.

8. A phonograph turntable assembly as set forth in claim 6, in which the natural period of vibration of both the supporting plate and turntable is less than ten cycles per second.

9. A phonograph turntable assembly as set forth in claim 6 having a motor provided with means for operatively connecting it to the turntable for causing the rotation thereof and spring mounting means for supporting the motor, the spring constant of the spring mounting means relative to the weight of the motor being such that the natural period of vibration of the motor is below the audio sound band.

10. A phonograph turntable assembly as set forth in claim 6 having a motor supported on the supporting structure and an operative connection between the motor and the turntable for causing the rotation thereof, said operative connection including a friction drive wheel including a flexible deformable central portion and a flexible rim presenting a friction-wear surface.

11. A phonograph turntable assembly comprising a support system including a turntable having a flat upper surface for supporting a phonograph record to be tracked by the stylus of the pickup of a tone arm and a first magnet mounted adjacent the center of the turntable, and a support for said system including a second magnet mounted beneath the turntable with the poles of said magnets being arranged in superimposed vertically spaced repelling relationship, means for maintaining said magnets in said superimposed relationship, the said magnets being arranged concentrically with respect to the center of said turntable, the said magnets presenting vertically opposing magnetic fields of sufficient strength to support the weight of said turntable against the force of gravity and the repelling force of the magnets relative to the weight of said turntable being such that the natural period of vibration of the system is of lower frequency than the audio sound band such that the tone arm and pickup are substantially isolated from external vibrations within the audio frequency range.

12. A phonograph turntable assembly as set forth in claim 11, in which the natural period of vibration of the system is less than ten cycles per second.

(References on following page)

References Cited in the file of this patent

UNITED STATES PATENTS

| | | |
|---|---|---|
| 1,555,150 | Oswald | Sept. 29, 1925 |
| 1,719,890 | Kinnard et al. | July 9, 1929 |
| 1,838,047 | Zabriskie | Dec. 22, 1931 |
| 2,315,408 | Faus | Mar. 30, 1943 |
| 2,377,175 | Peer | May 29, 1945 |
| 2,485,848 | Sharp | Oct. 25, 1949 |

FOREIGN PATENTS

| | | |
|---|---|---|
| 386,693 | Great Britain | Jan. 26, 1933 |
| 461,737 | Canada | Dec. 13, 1949 |
| 462,367 | Canada | Jan. 10, 1950 |

OTHER REFERENCES

"Highway Hi-Fi," by Peter C. Goldmark, Audio, December 1955 (pp. 15–17 and 63, 64).